US011921457B2

(12) United States Patent
Wang et al.

(10) Patent No.: US 11,921,457 B2
(45) **Date of Patent: *Mar. 5, 2024**

(54) DRUM UNIT

(71) Applicant: BROTHER KOGYO KABUSHIKI KAISHA, Nagoya (JP)

(72) Inventors: Yuwen Wang, Nagoya (JP); Junichi Hashimoto, Toyohashi (JP); Isao Kishi, Nagoya (JP); Kazuaki Ooka, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/717,555

(22) Filed: Apr. 11, 2022

(65) Prior Publication Data

US 2022/0236689 A1 Jul. 28, 2022

Related U.S. Application Data

(63) Continuation of application No. 17/174,540, filed on Feb. 12, 2021, now Pat. No. 11,320,779, which is a (Continued)

(30) Foreign Application Priority Data

Mar. 30, 2018 (JP) ................................ 2018-067899

(51) Int. Cl.

*G03G 15/08* (2006.01)
*G03G 21/16* (2006.01)
*G03G 21/18* (2006.01)

(52) U.S. Cl.

CPC ..... *G03G 21/1671* (2013.01); *G03G 15/0889* (2013.01); *G03G 21/1623* (2013.01); (Continued)

(58) Field of Classification Search

CPC ....... G03G 21/1853; G03G 2221/1654; G03G 2221/1869; G03G 21/1871; G03G 21/1864; G03G 21/1842

See application file for complete search history.

(56) References Cited

U.S. PATENT DOCUMENTS 5,049,940 A 9/1991 Yamaguchi et al.
8,934,814 B2 1/2015 Su
(Continued)

FOREIGN PATENT DOCUMENTS

CN 2891011 Y 4/2007
CN 101614996 A 12/2009
(Continued)

OTHER PUBLICATIONS

Office Action issued in corresponding Japanese Patent Application No. 2018-067899, dated Mar. 1, 2022.
(Continued)

*Primary Examiner* — Sevan A Aydin
(74) *Attorney, Agent, or Firm* — Merchant & Gould P.C.

(57) ABSTRACT

A photosensitive drum is rotatable about a drum axis extending in a first direction. A frame includes a first side plate located at first end in the first direction and a second side plate spaced from the first side plate in the first direction. The frame rotatably supports the photosensitive drum between the first side plate and the second side plate in the first direction. The frame holds a developer cartridge. A lock lever is pivotable about a pivot axis extending in a second direction intersecting with the first direction. The lock lever is movable between a lock position at which the developer cartridge is locked on the frame and a release position at which the developer cartridge is unlocked from the frame.

8 Claims, 15 Drawing Sheets

Related U.S. Application Data continuation of application No. 16/926,870, filed on Jul. 13, 2020, now Pat. No. 10,942,485, which is a continuation of application No. 16/656,893, filed on Oct. 18, 2019, now Pat. No. 10,725,427, which is a continuation of application No. 16/144,178, filed on Sep. 27, 2018, now Pat. No. 10,488,813.

(52) U.S. Cl.
CPC ..... *G03G 21/1647* (2013.01); *G03G 21/1853* (2013.01); *G03G 2221/1678* (2013.01)

(56) References Cited

U.S. PATENT DOCUMENTS

| | | | | |
|---|---|---|---|---|
| 10,488,813 | B2* | 11/2019 | Wang | G03G 21/1853 |
| 10,725,427 | B2* | 7/2020 | Wang | G03G 21/1623 |
| 10,942,485 | B2* | 3/2021 | Wang | G03G 21/1623 |
| 11,320,779 | B2* | 5/2022 | Wang | G03G 21/1676 |
| 2004/0101327 | A1 | 5/2004 | Nomura et al. | |
| 2005/0169667 | A1 | 8/2005 | Katoh | |
| 2006/0093398 | A1 | 5/2006 | Hayakawa | |
| 2006/0147226 | A1* | 7/2006 | Sato | G03G 21/1685 399/122 |
| 2006/0275052 | A1 | 12/2006 | Ishikawa | |
| 2007/0146311 | A1 | 6/2007 | Lin et al. | |
| 2007/0147885 | A1 | 6/2007 | Okabe et al. | |
| 2009/0324275 | A1 | 12/2009 | Okabe | |
| 2010/0080624 | A1 | 4/2010 | Matsuda | |
| 2010/0135693 | A1 | 6/2010 | Okabe et al. | |
| 2010/0166457 | A1 | 7/2010 | Hashimoto | |
| 2011/0026968 | A1 | 2/2011 | Ishii et al. | |
| 2011/0064457 | A1 | 3/2011 | Okabe et al. | |
| 2011/0229194 | A1 | 9/2011 | Okabe et al. | |
| 2012/0003000 | A1 | 1/2012 | Nishiyama et al. | |
| 2012/0057900 | A1 | 3/2012 | Okabe | |
| 2012/0070186 | A1 | 3/2012 | Kikuchi et al. | |
| 2012/0163858 | A1* | 6/2012 | Fujii | G03G 21/105 399/116 |
| 2012/0269543 | A1 | 10/2012 | Hashimoto | |
| 2013/0129386 | A1 | 5/2013 | Hashimoto | |
| 2013/0294799 | A1 | 11/2013 | Okabe et al. | |
| 2014/0023407 | A1 | 1/2014 | Hashimoto | |
| 2014/0132137 | A1 | 5/2014 | Wu | |
| 2015/0003869 | A1 | 1/2015 | Hashimoto | |
| 2015/0323885 | A1 | 11/2015 | Hashimoto | |
| 2015/0370220 | A1 | 12/2015 | Hashimoto | |
| 2017/0097588 | A1 | 4/2017 | Fukamachi et al. | |
| 2017/0176925 | A1 | 6/2017 | Sakakibara | |
| 2020/0209803 | A1* | 7/2020 | Kimura | G03G 21/1619 |

FOREIGN PATENT DOCUMENTS

| | | | |
|---|---|---|---|
| CN | 101923297 | A | 12/2010 |
| CN | 102193373 | A | 9/2011 |
| CN | 102749822 | A | 10/2012 |
| JP | 2004-66611 | A | 3/2004 |
| JP | 2005-91584 | A | 4/2005 |
| JP | 2005-157113 | A | 6/2005 |
| JP | 2005-189664 | A | 7/2005 |
| JP | 2007-41104 | A | 2/2007 |
| JP | 2007-101635 | A | 4/2007 |
| JP | 2007-178657 | A | 7/2007 |
| JP | 2010-102297 | A | 5/2010 |
| JP | 2010-128336 | A | 6/2010 |
| JP | 2010-151952 | A | 7/2010 |
| JP | 2011-059510 | A | 3/2011 |
| JP | 2012-88686 | A | 5/2012 |
| JP | 2016-145906 | A | 8/2016 |
| JP | 2017-111373 | A | 6/2017 |
| WO | 88/05562 | A1 | 7/1988 |

OTHER PUBLICATIONS

Notice of Reasons for Refusal issued in corresponding Japanese Patent Application No. 2018-067899, dated Jun. 28, 2022.

Office Action issued in corresponding Chinese Patent Application No. 201910243282.0, dated Sep. 9, 2022.

* cited by examiner

DRUM UNIT

CROSS-REFERENCE TO RELATED APPLICATION

This application is a continuation of U.S. patent application Ser. No. 17/174,540, filed Feb. 12, 2021, now U.S. Pat. No. 11,320,779, which is a continuation of U.S. patent application Ser. No. 16/926,870, filed Jul. 13, 2020, now U.S. Pat. No. 10,942,485, which is a continuation of U.S. patent application Ser. No. 16/656,893, filed Oct. 18, 2019, now U.S. Pat. No. 10,725,427, which is a continuation of U.S. patent application Ser. No. 16/144,178, filed Sep. 27, 2018, now U.S. Pat. No. 10,488,813, which further claims priority from Japanese Patent Application No. 2018-067899 filed on Mar. 30, 2018. The contents of the aforementioned applications are incorporated herein by reference in their entirety.

TECHNICAL FIELD

Aspects of the disclosure relate to a drum unit.

BACKGROUND

Electrophotographic image forming apparatuses known in the art include laser printers and light-emitting diode (LED) printers. An image forming apparatus includes developer cartridges and a drum unit. The drum unit includes a plurality of photosensitive drums. Each photosensitive drum is rotatable about a drum axis extending in an axial direction. The developer cartridges are removable from the drum unit. When a developer cartridge is attached to the drum unit, a developing roller of the developer cartridge contacts the photosensitive drum of the drum unit.

The drum unit includes a frame for holding a plurality of developer cartridges, and lock levers for locking the developer cartridges held in the frame. Each developer cartridge is attached to a corresponding slot of the frame. Each lock lever is pivotable about a pivot axis extending in the axial direction between a lock position and a release position. When the lock lever is at the lock position, the developer cartridge is locked on the frame. When the lock lever is at the release position, the developer cartridge is removable from the frame.

SUMMARY

To allow each lock lever to pivot about the pivot axis from the lock position to the release position, this image forming apparatus provides a clearance for each lock lever between the developer cartridges held in the frame. In this structure, adjacent developer cartridges cannot be arranged close to each other. Techniques are awaited for downsizing the drum unit in a direction in which the photosensitive drums are arranged.

In response to the above issue, one or more aspects of the present invention are directed to a drum unit including adjacent developer cartridges arranged close to one another, and thus downsized in the direction in which the photosensitive drums are arranged.

A first aspect of the disclosure provides a drum unit with the structure described below. The drum unit includes a photosensitive drum, a frame, and a lock lever. The photosensitive drum is rotatable about a drum axis extending in a first direction. The frame includes a first side plate located at first end in the first direction and a second side plate spaced from the first side plate in the first direction. The frame rotatably supports the photosensitive drum between the first side plate and the second side plate in the first direction. The frame holds a developer cartridge. The lock lever is movable, and in some examples, is pivotable about a pivot axis extending in a second direction intersecting with the first direction. The lock lever is movable between a lock position at which the developer cartridge is locked on the frame and a release position at which the developer cartridge is unlocked from the frame.

A second aspect of disclosure provides a drum unit with the structure described below. The drum unit includes a photosensitive drum, a frame, and a lock lever. The photosensitive drum is rotatable about a drum axis extending in a first direction. The frame includes a first side plate located at a first end of the frame in the first direction and a second side plate spaced from the first side plate in the first direction. The frame rotatably supports the photosensitive drum between the first side plate and the second side plate in the first direction. The lock lever is received in an opening of the first side plate of the frame. The lock lever has a first end, and a second end. The second end of the lock lever is positioned opposite to the first end. The second end of the lock lever is movable, and some examples, is pivotable about a pivot axis extending in a second direction intersecting with the first direction. The lock lever is pivotable between a lock position at which at least a portion of the second end of the lock lever is located between the first side plate and the second side plate, and a release position at which at least a portion of the second end of the lock lever extends from the first side plate away from the second side plate in the first direction.

A third aspect of the disclosure provides a drum unit with the structure described below. The drum unit includes a plurality of photosensitive drums, a frame, a plurality of lock levers. Each of the plurality of photosensitive drum is rotatable about a drum axis extending in a first direction. The plurality of photosensitive drums are arranged in a second direction intersecting with the first direction. The frame includes a first side plate located at a first end of the frame in the first direction and a second side plate spaced from the first side plate in the first direction. The frame rotatably supports the plurality of photosensitive drums between the first side plate and the second side plate in the first direction. The frame holds a plurality of developer cartridges. Each of the plurality of lock levers are movably, and in some examples, is pivotable supported by the frame and spaced apart in the second direction. Each of the plurality of lock levers may move between a lock position and a release position. Each of the plurality of lock levers is positioned so that a first outer surface of the corresponding developer cartridge held by the frame completely overlaps the lock lever as viewed in the first direction.

DETAILED DESCRIPTION

Embodiments of the present disclosure will now be described with reference to the drawings.

A first direction herein refers to the direction along a drum axis of a photosensitive drum. A second direction herein refers to a direction in which a plurality of photosensitive drums are arranged. A third direction herein refers to the longitudinal direction of each end face of a developer cartridge attached to the drum unit. The first direction, the second direction, and the third direction intersect with one another (at right angles in some embodiments).

1. Structure of Image Forming Apparatus

Figure 1:
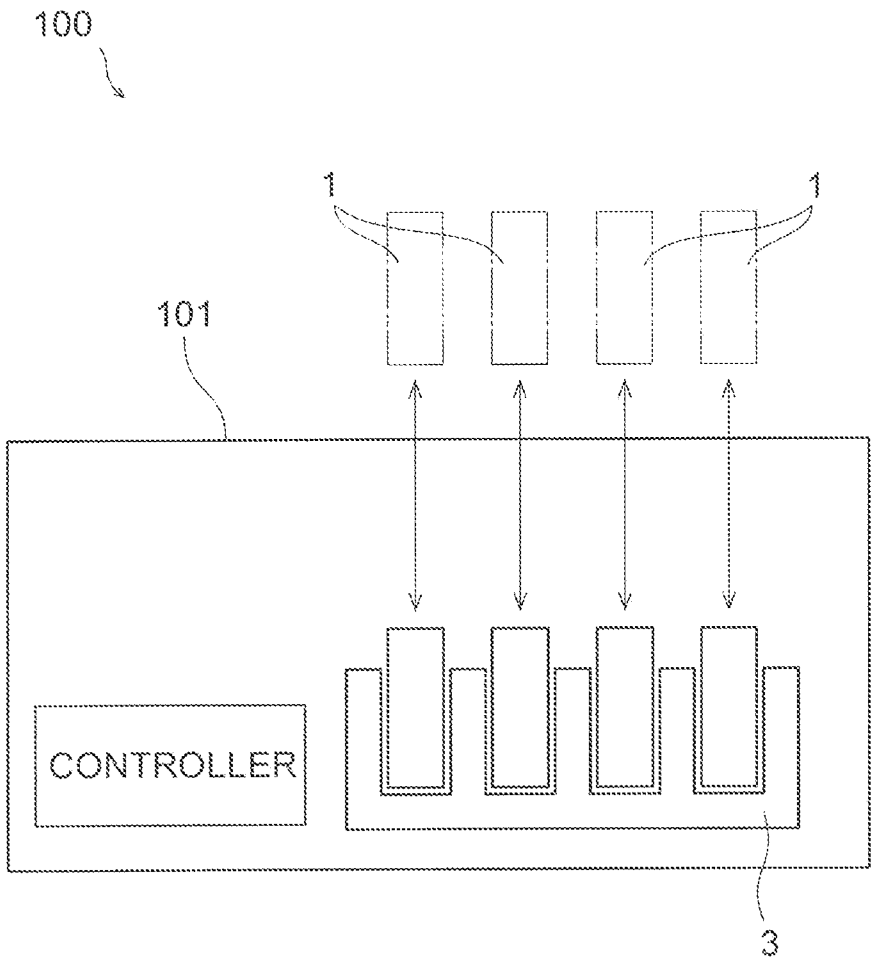
FIG. 1 is a conceptual diagram of an image forming apparatus.

FIG. 1 is a conceptual diagram of an image forming apparatus 100. The image forming apparatus 100 is an electrophotographic printer. The image forming apparatus 100 may be a laser printer or a light-emitting diode (LED) printer. As shown in FIG. 1, the image forming apparatus 100 includes a drum unit 3 and a plurality of developer cartridges 1. The drum unit 3 includes a frame that be configured to hold the developer cartridges 1.

Figure 2:
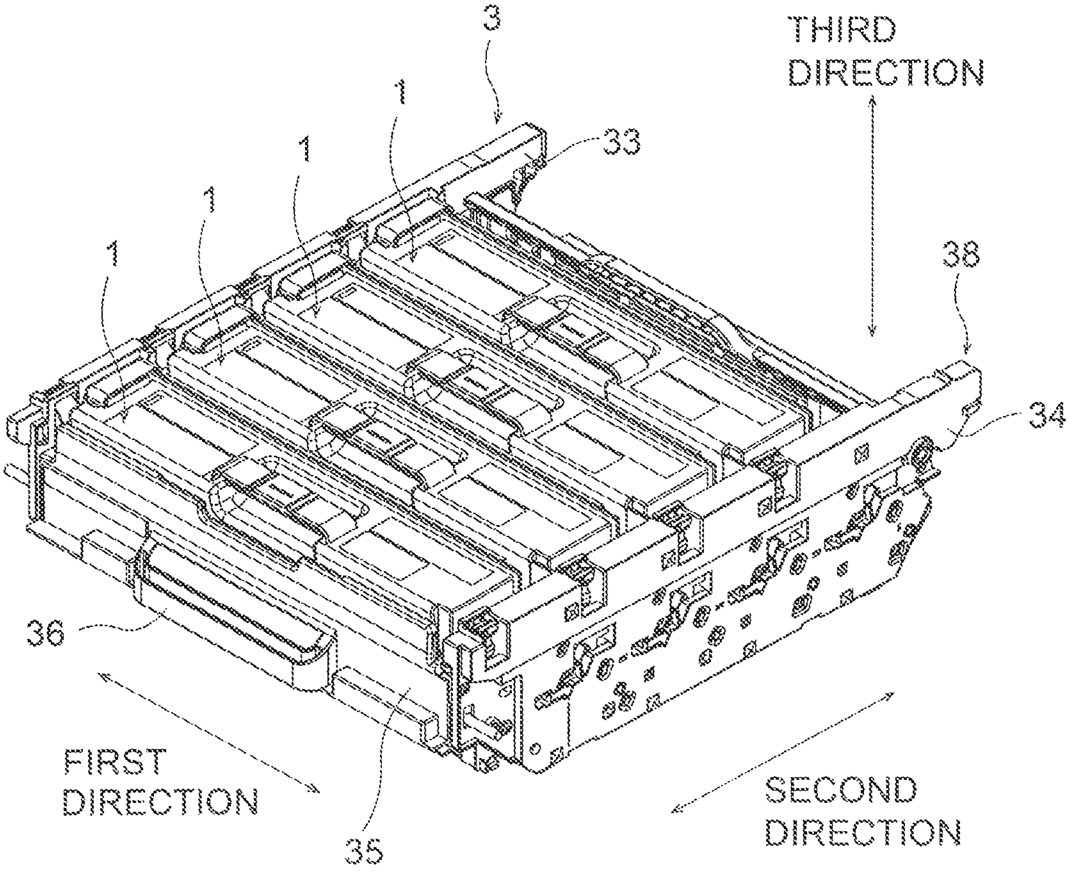
FIG. 2 is a perspective view of a drum unit and developer cartridges.

FIG. 2 is a perspective view of the drum unit 3 and the developer cartridges 1. The developer cartridges 1 are individually attachable to the drum unit 3. The drum unit 3 holding the developer cartridges 1 is configured to be mounted onto the body casing 101 of the image forming apparatus 100 (refer to FIG. 1). The developer cartridges 1 each contain toner (developer) of a different color (e.g., cyan, magenta, yellow, or black). The image forming apparatus 100 forms (outputs) an image on the recording surface of a print sheet with toner fed from the developer cartridges 1. The drum unit 3 in the present embodiment holds four developer cartridges 1. In some embodiments, the drum unit 3 may hold one to three, or five or more developer cartridges 1.

2. Structure of Developer Cartridge

Figure 3:
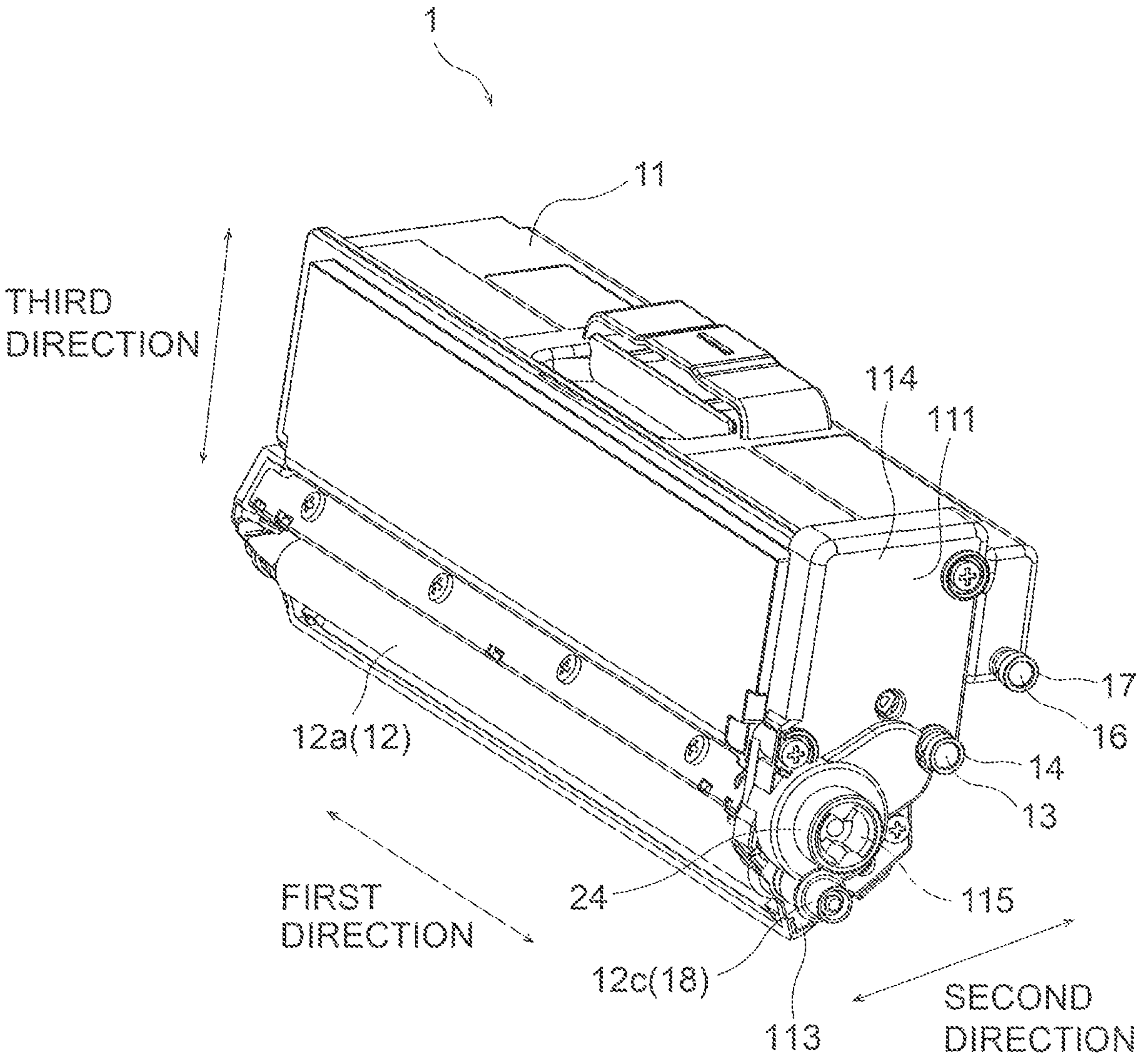
FIG. 3 is a perspective view of a developer cartridge.
Figure 4:
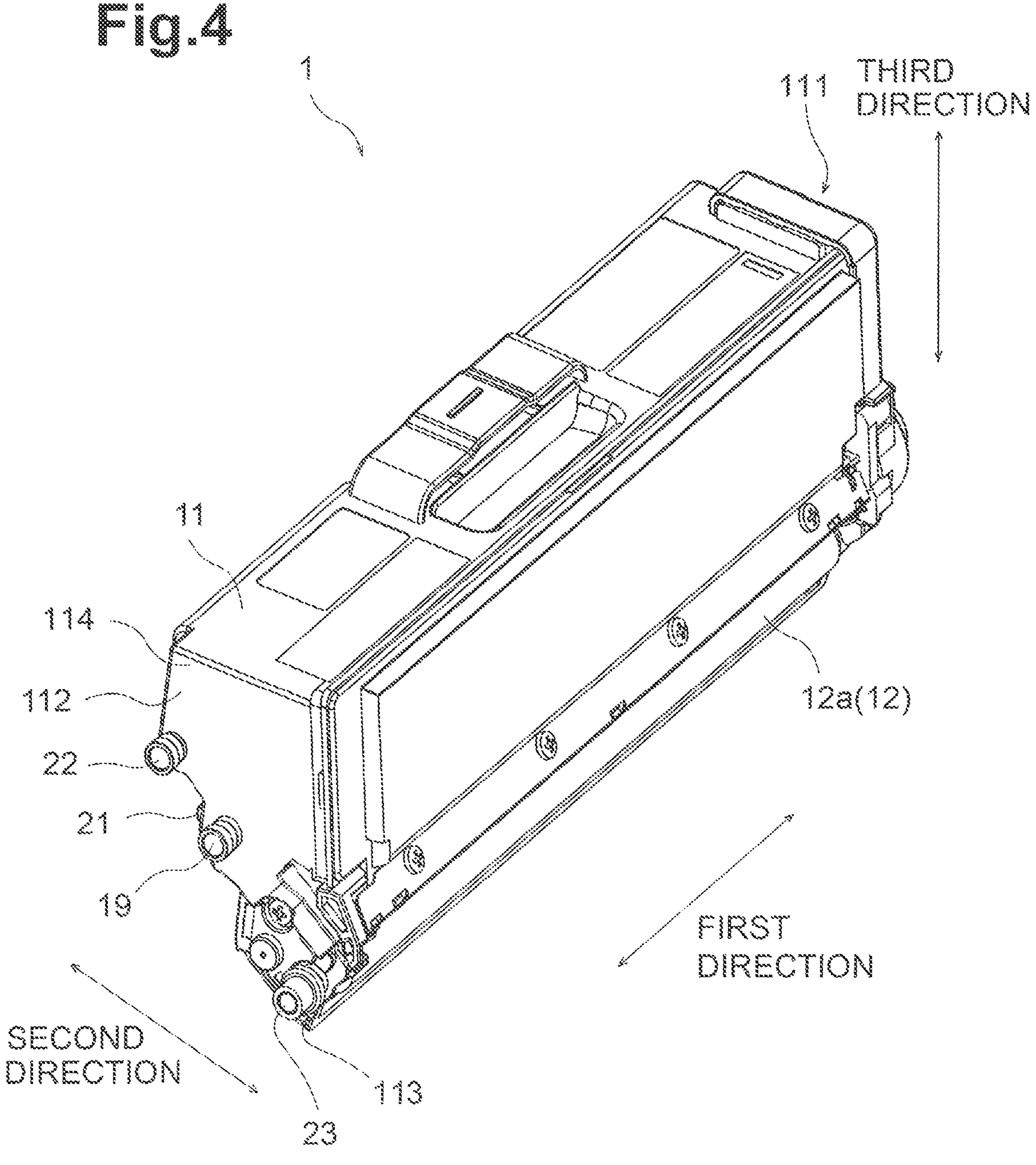
FIG. 4 is a perspective view of the developer cartridge as viewed in a direction different from FIG. 3.
Figure 5:
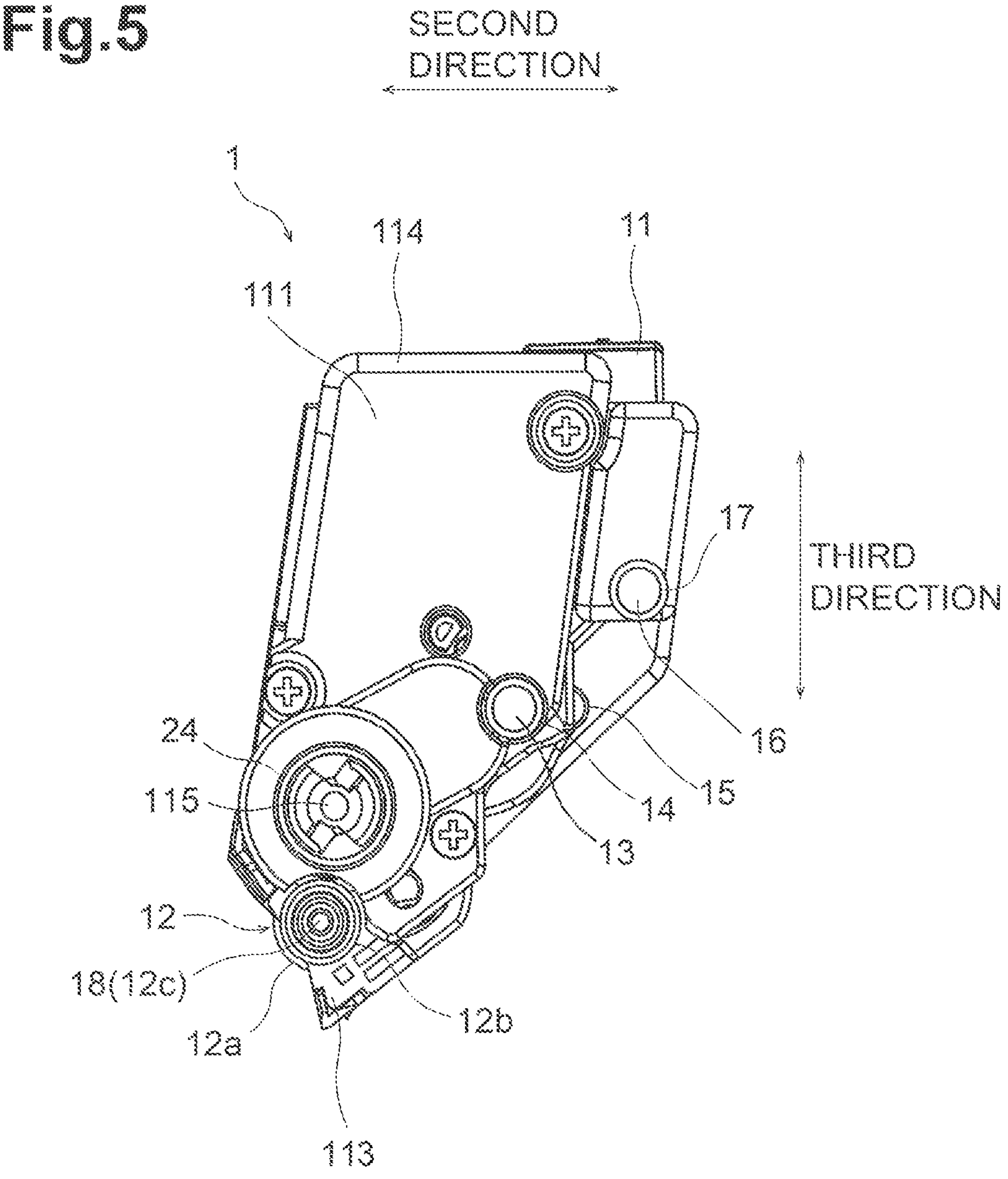
FIG. 5 is a side view of the developer cartridge at one end of the developer cartridge in a first direction.
Figure 6:
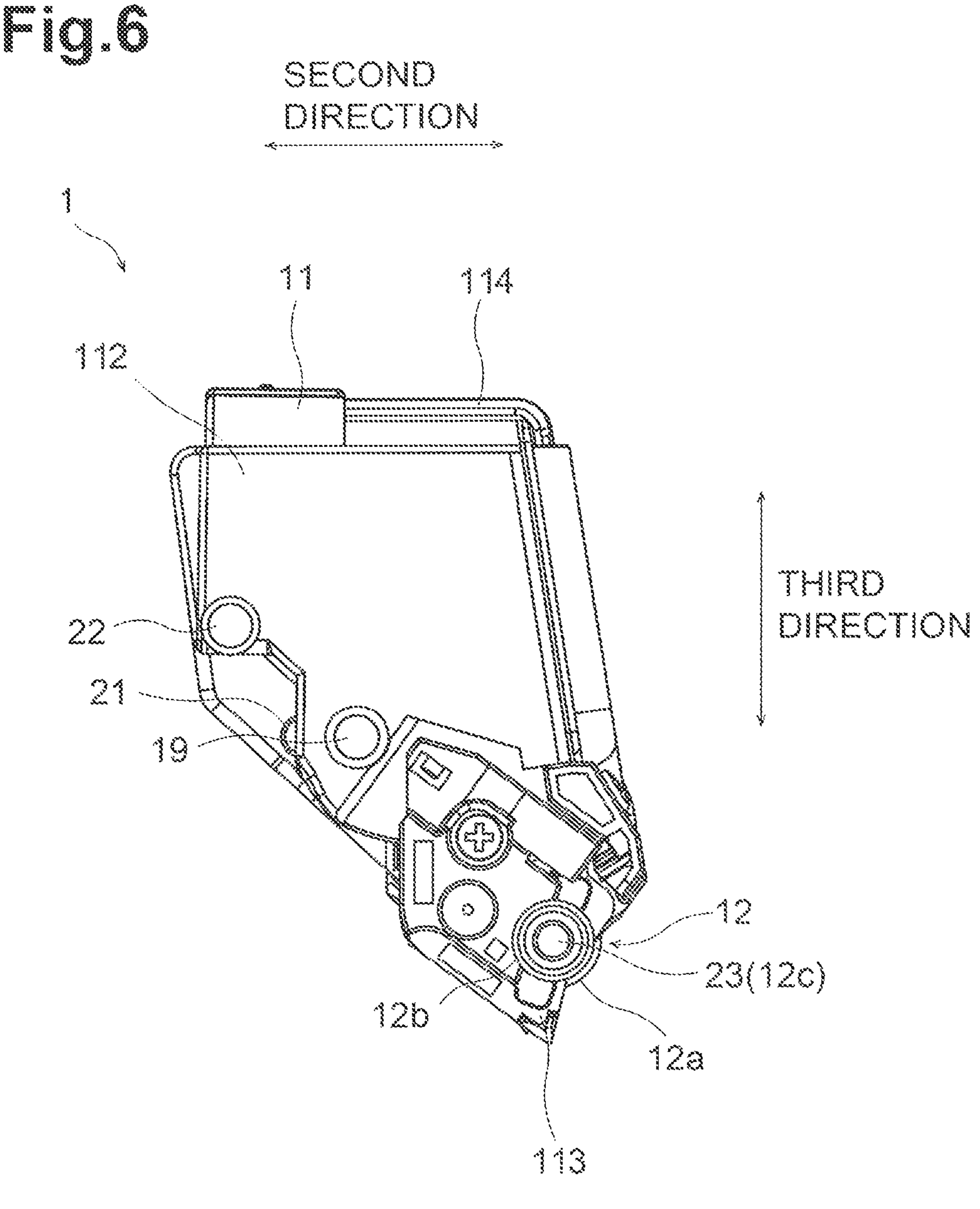
FIG. 6 is a side view of the developer cartridge at other end of the developer cartridge in the first direction.

FIGS. 3 and 4 are perspective views of the developer cartridge 1. FIGS. 5 and 6 show the end faces of the developer cartridge 1 in the first direction. As shown in FIGS. 3 to 6, the developer cartridge 1 according to the present embodiment includes a housing 11, a developing roller 12, an agitator (not shown), and a coupling 24.

The housing 11 is a casing configured to contain toner. The housing 11 has a chamber (not shown) configured to contain toner. The housing 11 extends in the first direction. The housing 11 has a first outer surface 111, and a second outer surface 112 located away from the first outer surface 111 in the first direction. The first outer surface 111 is one end face (first end face) of the housing 11 in the first direction. The longitudinal direction of the first outer surface 111 corresponds to the third direction. The second outer surface 112 is the other end face (second end face) of the housing 11 in the first direction. The longitudinal direction of the second outer surface 112 corresponds to the third direction. The housing 11 has a first end 113 in the third direction, and a second end 114 located away from the first end 113 in the third direction.

The developing roller 12 is rotatable about a roller axis extending in the first direction. The developing roller 12 is located between the first outer surface 111 of the housing and the second outer surface 112 of the housing 11 in the first direction. The developing roller 12 is located nearer the first end 113 than the second end 114 in the third direction.

More specifically, the developing roller 12 includes a developing roller body and a developing roller shaft 12*c*. The developing roller body is cylindrical. The developing roller shaft 12*c* is cylindrical. The developing roller shaft 12*c* extends through the center of the developing roller body. The developing roller shaft 12*c* rotates together with the developing roller body. The developing roller shaft 12*c* has two ends in the first direction supported by the two end faces of the housing 11 in a rotatable manner.

The developing roller 12 (developing roller body) has an uncovered surface 12*a* and a covered surface 12*b*. The uncovered surface 12*a* is located at one end (first end) of the developing roller 12 in the second direction, which is exposed outside the housing 11. The covered surface 12*b* is located at other end (second end) of the developing roller 12 in the second direction, which is located inside the housing 11. When the developer cartridge 1 is attached to the drum unit 3, the peripheral surface (uncovered surface 12*a*) of the developing roller 12 contacts the peripheral surface of the photosensitive drum 31.

The agitator (not shown) is rotatable about an agitator axis extending in the first direction. The agitator includes a plurality of agitation blades. The agitator is located between the first outer surface 111 of the housing 11 and the second outer surface 112 of the housing 11 in the first direction. In the third direction, the agitator is located nearer the second end 114 of the housing 11 than the developing roller 12. The agitator rotates to agitate the toner contained in the chamber of the housing 11.

The coupling 24 shown in FIGS. 3 and 5 receives a drive force applied from the body of the image forming apparatus 100. The coupling 24 is rotatable about an coupling axis extending in the first direction. The coupling 24 is located nearer the second end 114 of the housing 11 than the developing roller 12 in the third direction. The coupling 24 has a recess 115 in the first direction. When the developer cartridge 1 attached to the drum unit 3 is mounted onto the body casing 101 of the image forming apparatus 100, the drive shaft of the body casing 101 of the image forming apparatus 100 is received in the recess 115. This connects the coupling 24 to the drive shaft in a manner non-rotatable relative to each other. The rotation of the drive shaft rotates the coupling 24. The rotation of the coupling 24 then rotates the developing roller 12 and the agitator.

3. Structure of Drum Unit

Figure 7:
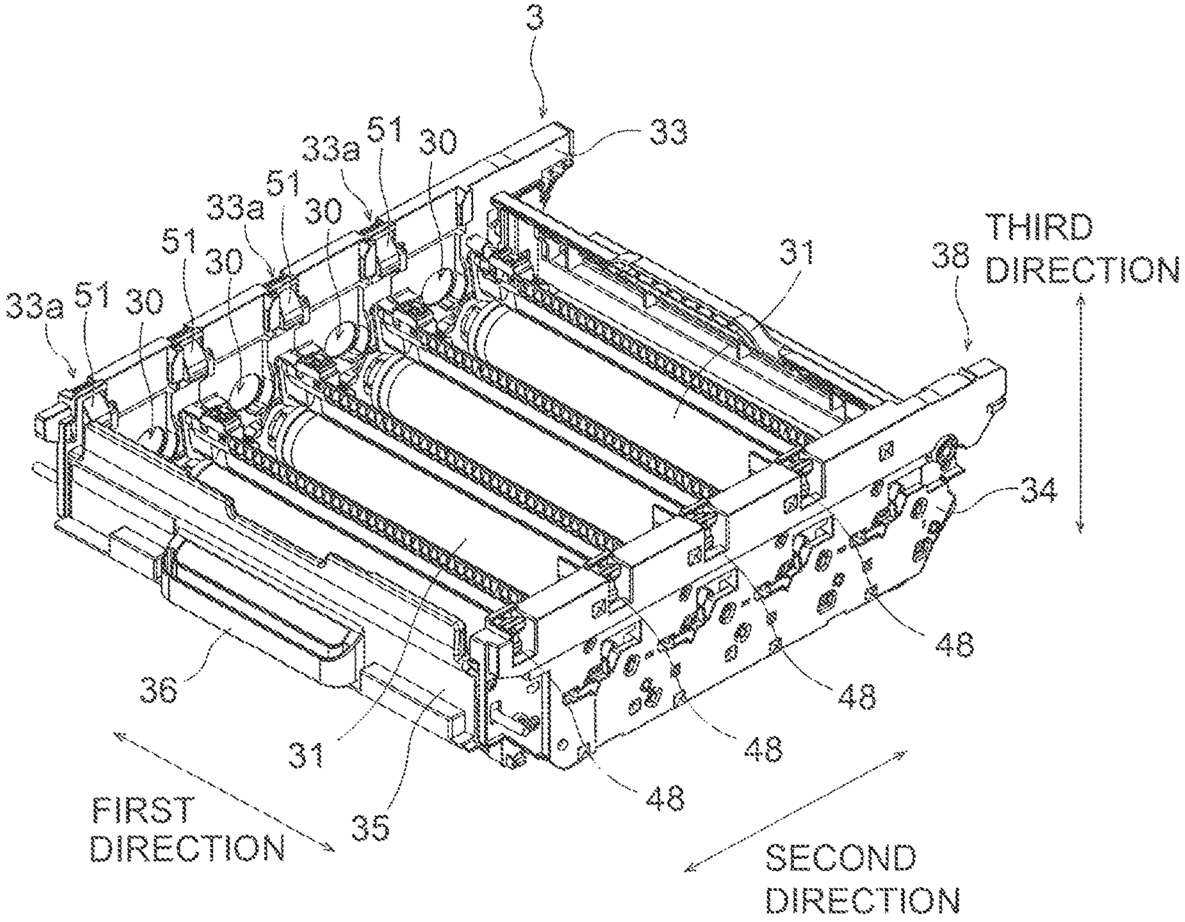
FIG. 7 is a perspective view of the drum unit.

The structure of the drum unit 3 will now be described with reference mainly to FIG. 7. FIG. 7 is a perspective view of the drum unit 3.

Figure 8:
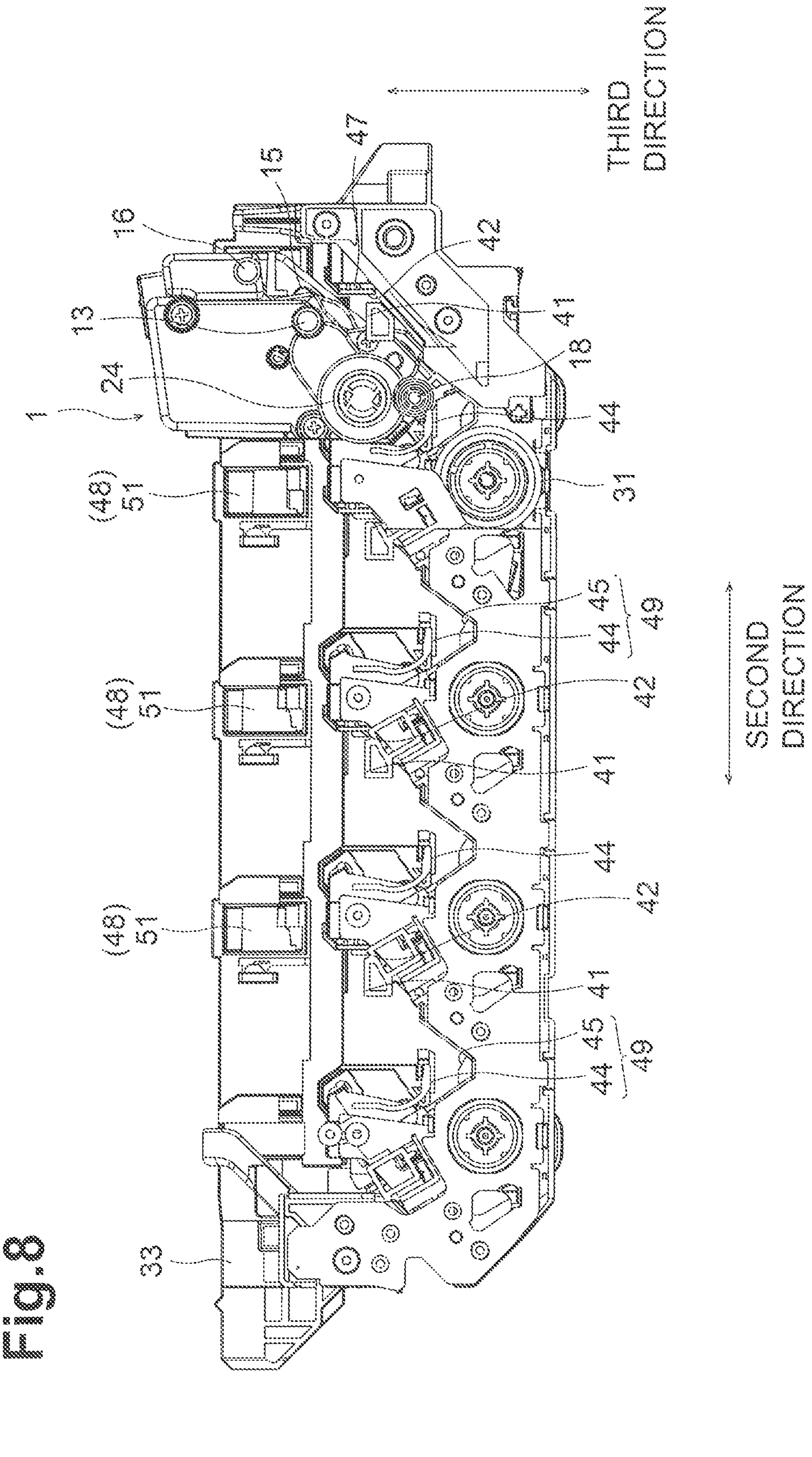
FIG. 8 is a side view of the drum unit showing inner structure of the drum unit during attachment of the developer cartridge to the drum unit.
Figure 9:
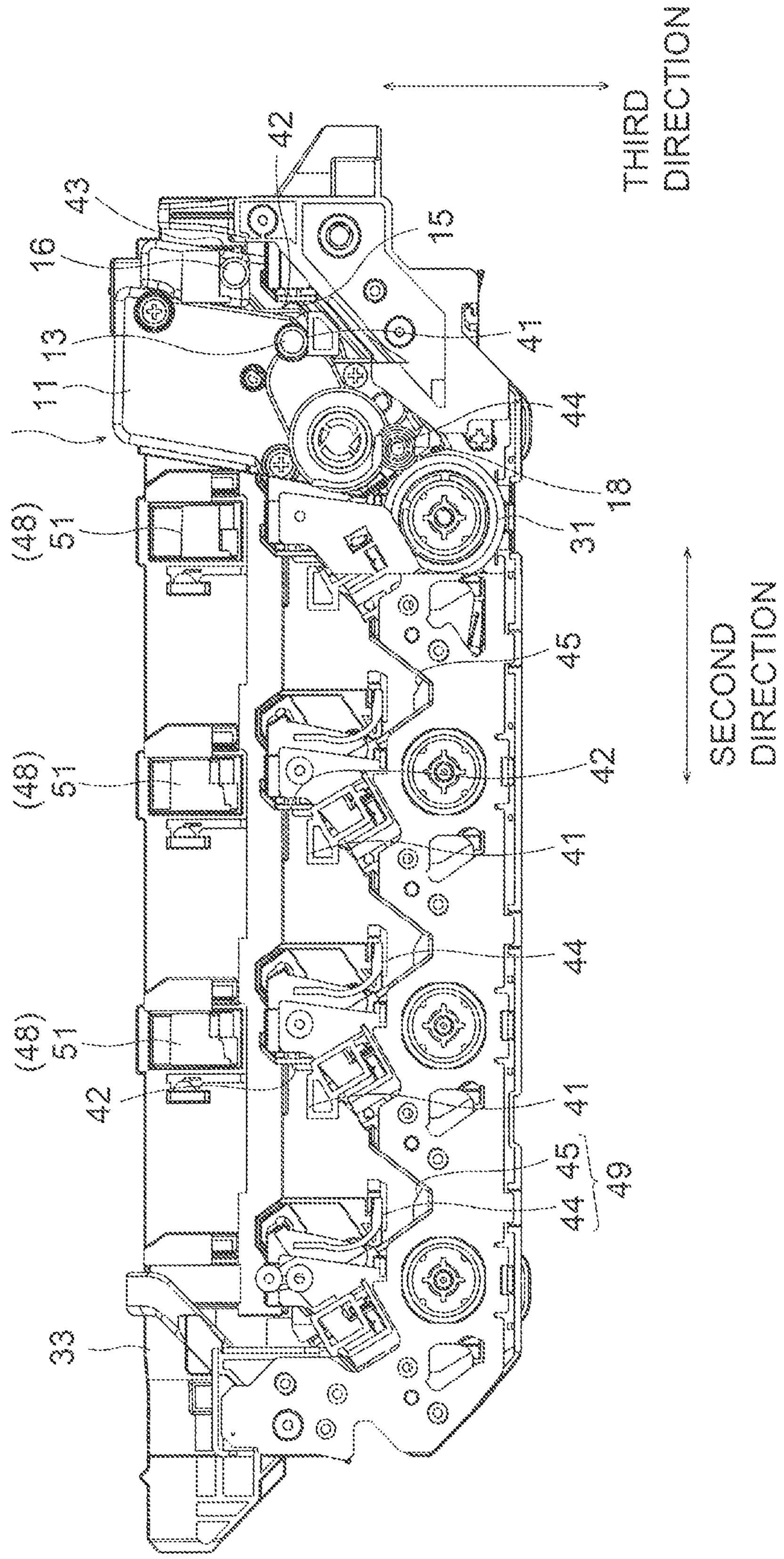
FIG. 9 is a side view of the drum unit showing inner structure of the drum unit, in which the developer cartridge is attached to the drum unit.

The drum unit 3 according to the present embodiment is a drum cartridge. As shown in FIGS. 7 to 9, the drum unit 3 includes a plurality of photosensitive drums 31, a first side plate 33, a second side plate 34, and a pullout plate 35. In the present embodiment, the drum unit 3 includes four photosensitive drums 31.

The photosensitive drums 31 transfer toner fed from the developer cartridges 1 to a print sheet. The photosensitive drums 31 are arranged at intervals in the second direction. Each photosensitive drum 31 is cylindrical. Each photosensitive drum has a peripheral surface. Each photosensitive drum extends in the first direction. The peripheral surface of the photosensitive drum 31 is coated with a photosensitive material. Each photosensitive drum 31 is rotatable about a drum axis of rotation extending in the first direction.

The first side plate 33, the second side plate 34, and the pullout plate 35 together define a frame 38 for holding the photosensitive drums 31. The frame 38 has an opening located at one end of the frame in the third direction (in the direction opposite the force of gravity in the present embodiment).

The first side plate 33 supports first ends of the photosensitive drums 31 in the first direction. The first side plate 33 extends perpendicular to the first direction. The first side plate 33 extends in the second direction. The first side plate 33 is a plate. The first side plate 33 includes a plurality of (four in the present embodiment) developer cartridge holders 30. The developer cartridge holders 30 are located at the inner surface of the first side plate 33 in the first direction. The developer cartridge holders 30 are arranged at intervals in the second direction. The developer cartridge holders 30 of the first side plate 33 receive first ends of the developer cartridges 1 in the first direction (ends at the first outer surfaces 111).

The second side plate 34 supports second ends of the photosensitive drums 31 in the first direction. The second side plate 34 extends perpendicular to the first direction. The second side plate 34 extends in the second direction. The second side plate 34 is a plate. The second side plate 34 includes a plurality of (four in the present embodiment) developer cartridge holders (not shown). The developer cartridge holders are located at the inner surface of the second side plate 34 in the first direction. Number of the developer cartridge holders of the second side plate 34 is equal to number of the developer cartridge holders 30 of the first side plate 33. The developer cartridge holders of the second side plate 34 receive second ends of the developer cartridges 1 in the first direction (ends at the second outer surfaces 112).

The pullout plate 35 connects a second end of the first side plate 33 in the second direction and a second end of the second side plate 34 in the second direction. The pullout plate 35 extends perpendicular to the second direction. The pullout plate 35 extends in the first direction. The pullout plate 35 is a plate. The pullout plate 35 has a handle 36. The handle 36 is located at an outer side surface of the pullout plate 35 in the second direction. The handle 36 is gripped by a user to pull or push the drum unit 3 out of or into the body casing 101.

When the developer cartridge 1 is attached to the drum unit 3, the first end of the housing 11 in the first direction held by the developer cartridge holder 30 of the first side plate 33 and the second end of the housing 11 in the first direction held by the developer cartridge holder of the second side plate 34. When the developer cartridge 1 is attached to the drum unit 3, the peripheral surface (uncovered surface 12*a*) of the developing roller 12 contacts the peripheral surface of the photosensitive drum 31.

The image forming apparatus 100 with the above structure forms an image on a print sheet in the manner described below. As the coupling 24 and also the photosensitive drum 31 rotate, the toner is fed from the chamber of the housing 11 to the peripheral surface of the photosensitive drum 31 through the developing roller 12. The toner retained on the peripheral surface of the developing roller 12 moves from the developing roller 12 to the photosensitive drum 31 in accordance with an electrostatic latent image formed on the peripheral surface of the photosensitive drum 31. The electrostatic latent image thus appears on the peripheral surface of the photosensitive drum 31. The photosensitive drum 31 then transfers the toner onto the print sheet.

4. Detailed Structure for Attachment and Removal

Figure 10:
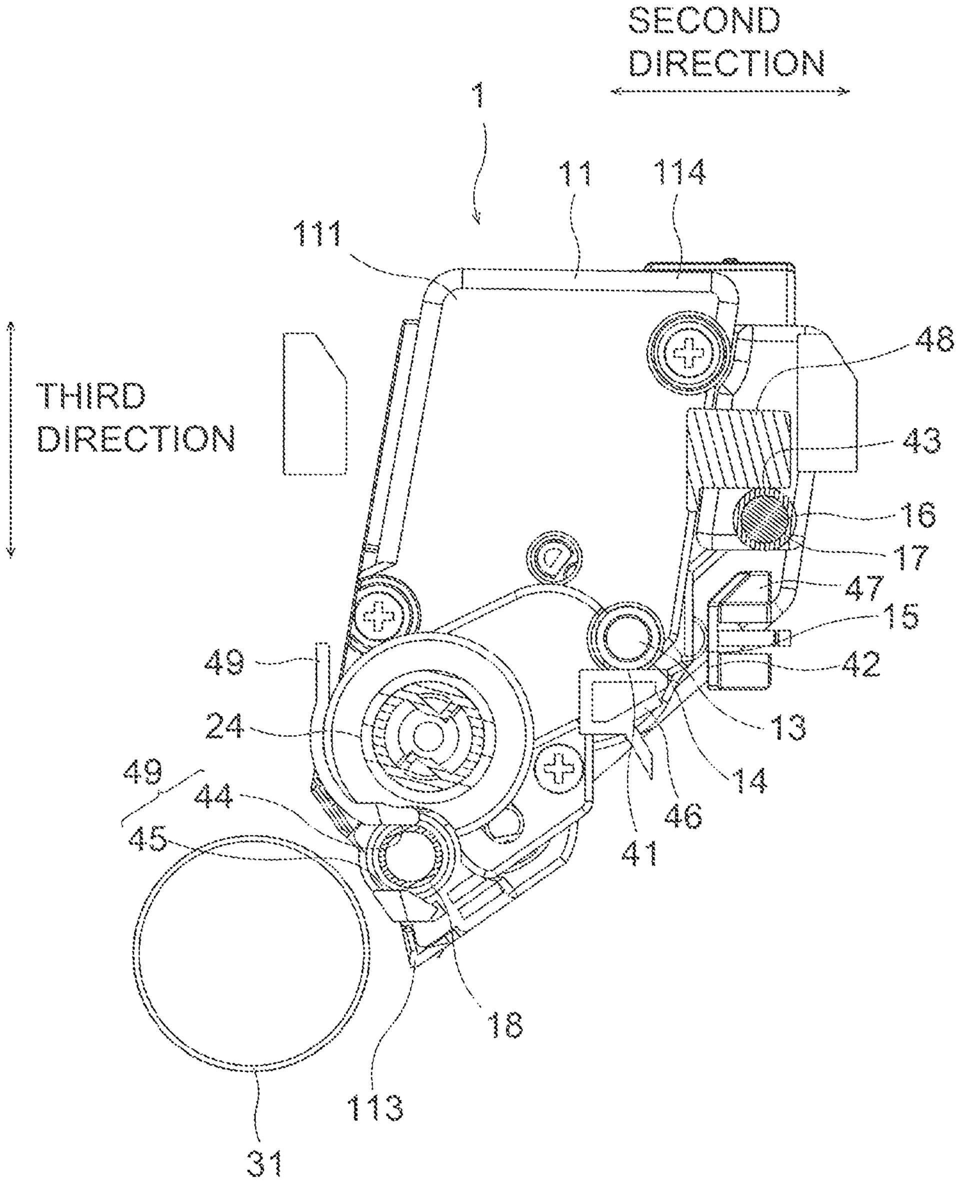
FIG. 10 is a side view of the developer cartridge during attachment of the developer cartridge to the drum unit.
Figure 11:
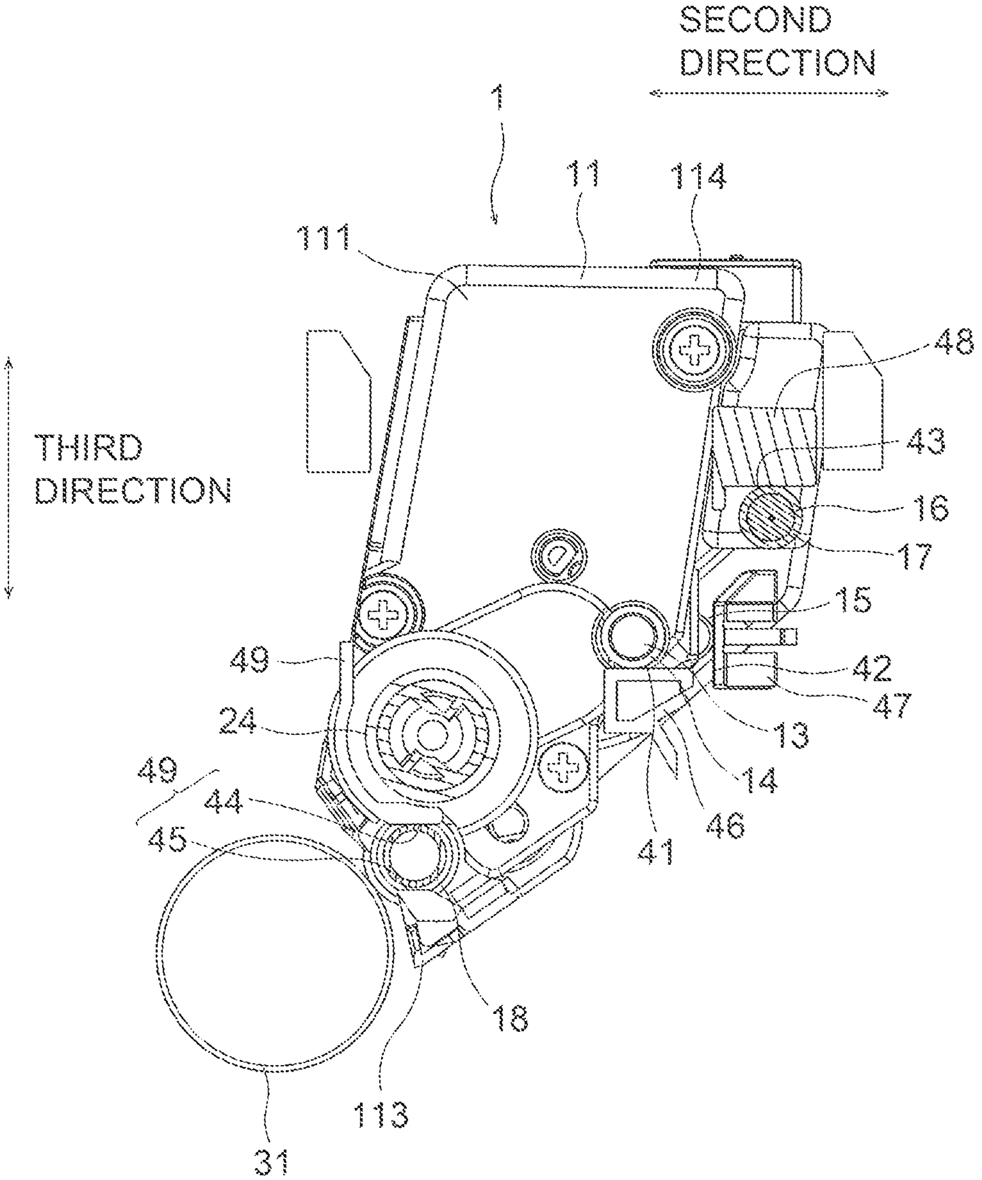
FIG. 11 is a side view of the developer cartridge that is attached to the drum unit.
Figure 12:
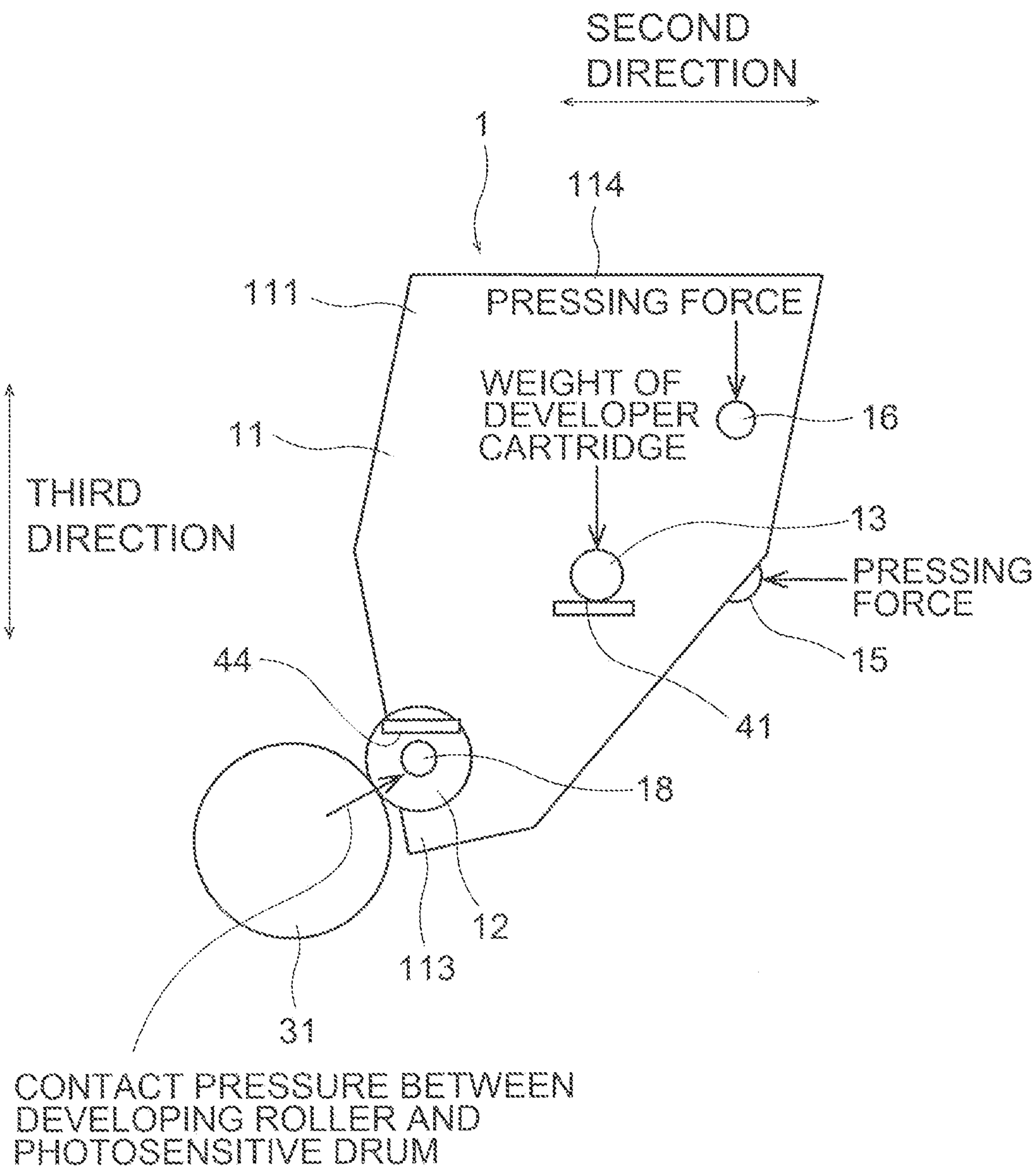
FIG. 12 is a schematic diagram describing forces acting relative to one another during attachment of the developer cartridge to the drum unit.
Figure 13:
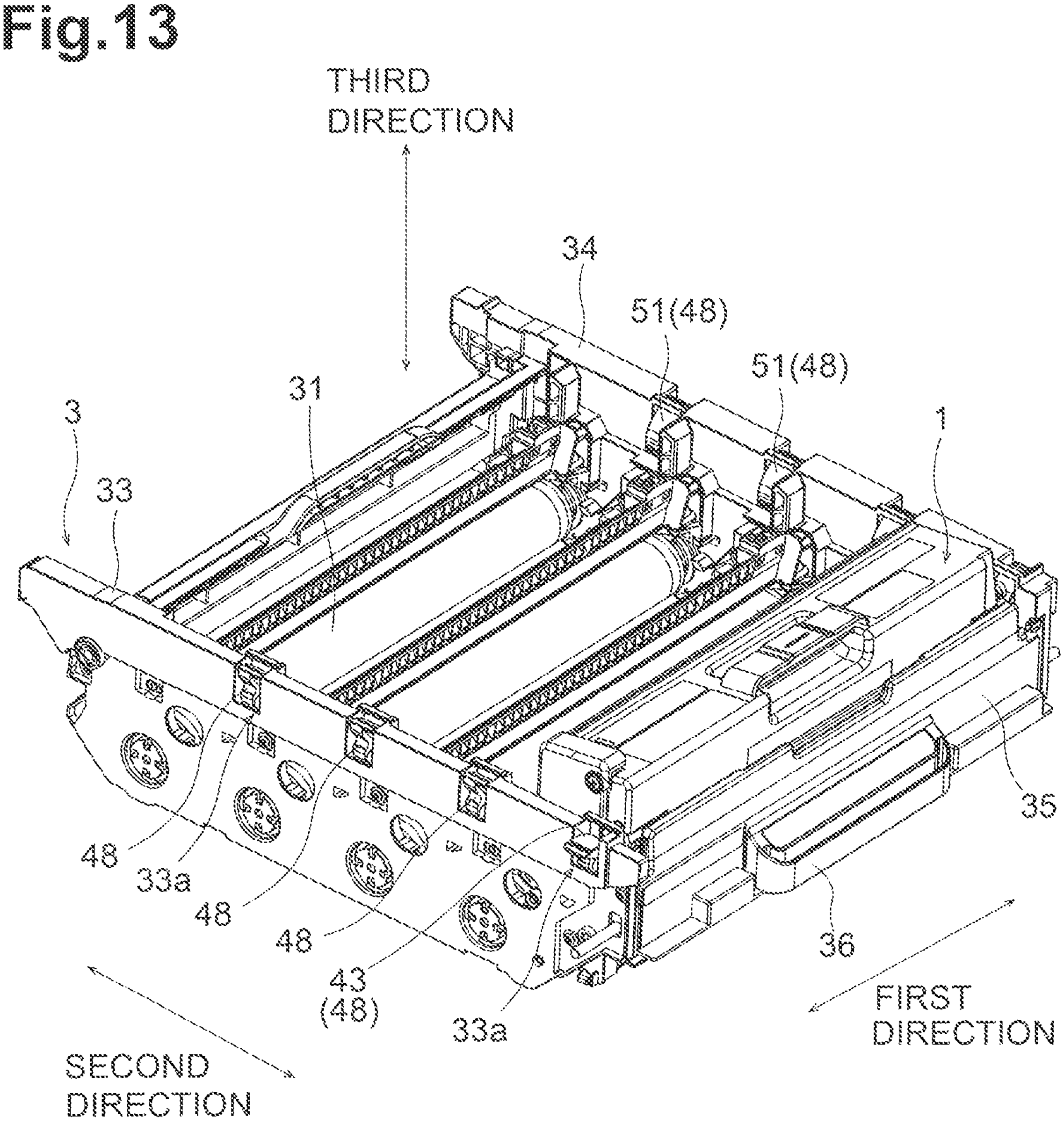
FIG. 13 is a perspective view of the drum unit, showing the lock lever attachment of the developer cartridge to the drum unit.
Figure 14:
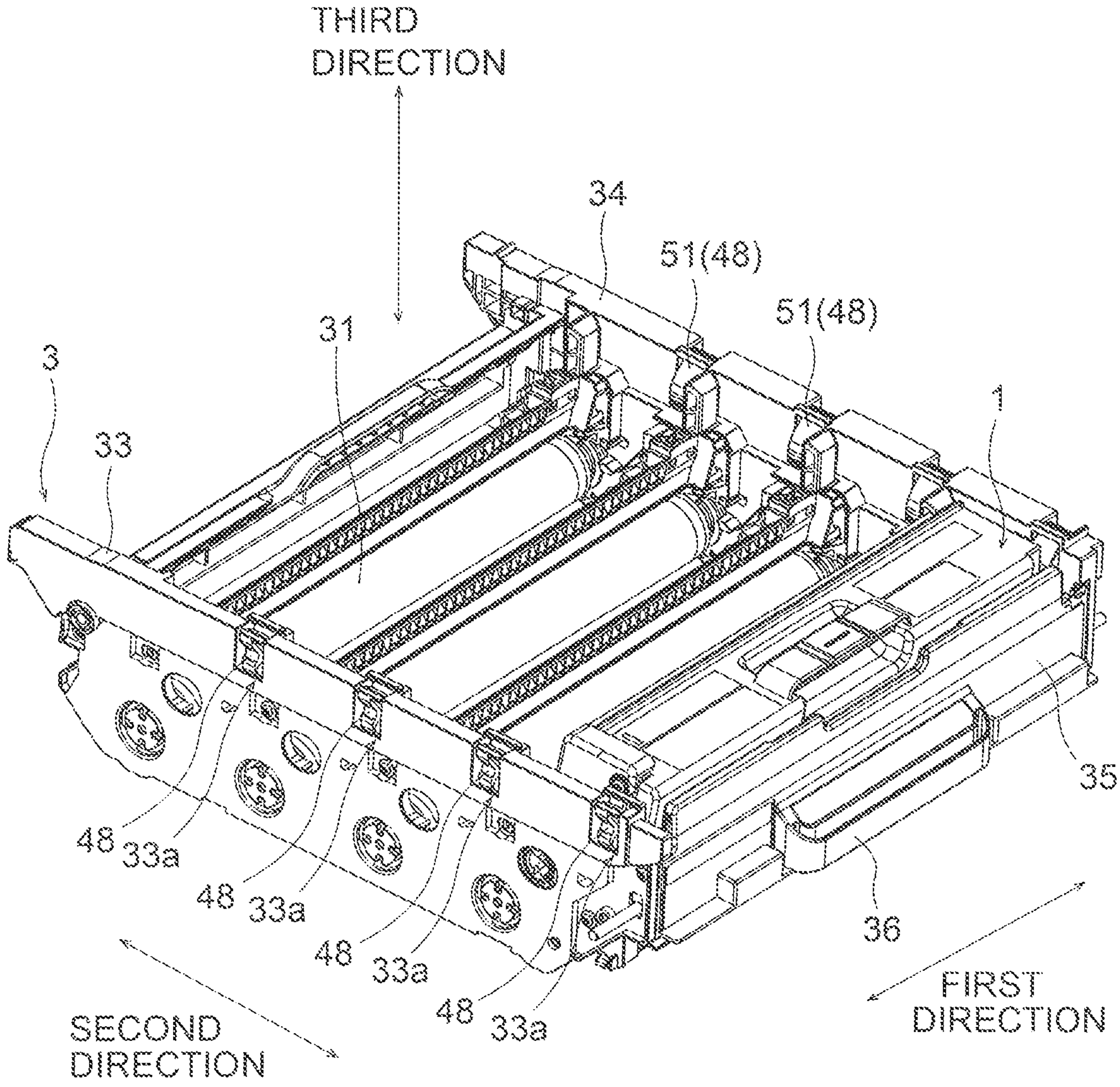
FIG. 14 is a perspective view of the drum unit, showing the lock lever when the developer cartridge is attached to the drum unit.
Figure 15:
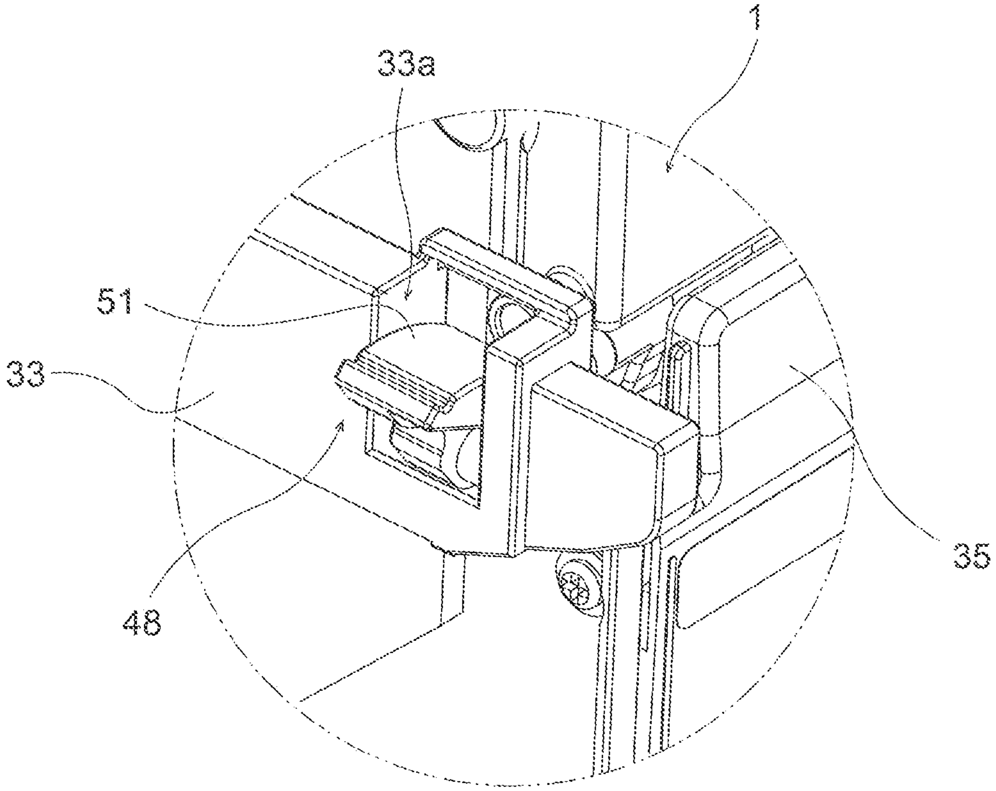
FIG. 15 is an enlarged view of the lock lever shown in FIG. 13 at a release position.

The structure according to the present embodiment for attaching and removing the developer cartridges 1 to and from the drum unit 3 will now be described with reference to FIGS. 3 to 15. FIG. 8 is a side view of the drum unit 3 showing inner structure of the drum unit 3 during attachment of one developer cartridge 1 to the drum unit 3. FIG. 9 is a side view of the drum unit 3 showing inner structure of the drum unit 3, in which the developer cartridge 1 is attached to the drum unit 3. FIG. 10 is a side view of the developer cartridge 1 during attachment of the developer cartridge 3 to the developer cartridge holder 30 of the drum unit 3. FIG. 11 is a side view of the developer cartridge 1 that is attached to the developer cartridge holder 30 of the drum unit 3. FIG. 12 is a schematic diagram describing forces acting relative to one another during attachment of the developer cartridge 1 to the developer cartridge holder 30 of the drum unit 3. FIG. 13 is a perspective view of the drum unit 3, showing the lock lever 48 during attachment of the developer cartridge 3 to the drum unit 3. FIG. 14 is a perspective view of the drum unit 3, showing the lock lever 48 when the developer cartridge 1 is attached to the drum unit 3. FIG. 15 is an enlarged view of the lock lever 48 shown in FIG. 13 at the release position.

The developer cartridge 1 according to the present embodiment includes a first boss 13, a first collar 14, a first pressure receiving surface 15, a second boss 16, a second collar 17, a first protrusion 18, a third boss 19, a second pressure receiving surface 21, a fourth boss 22, and a second protrusion 23.

The first boss 13 extends in the first direction. The first boss 13 in the present embodiment is a separate component from the housing 11, and is fixed to the housing 11. In some embodiments, the first boss 13 may be integral with the housing 11. The first boss 13 is movable together with the housing 11. The first boss 13 is located at the first outer surface 111. More specifically, the first boss 13 protrudes from the first outer surface 111 outward in the first direction. As described in detail later, the first boss 13 bears the weight of the developer cartridge 1. The first boss 13 is located away from the developing roller 12 in both the second and third directions. As described in detail later, the first boss 13 is supported by a support surface 41 (described later) of the drum unit 3 when the developer cartridge 1 is attached to the drum unit 3.

The first collar 14 is cylindrical. The first collar 14 is rotatable about the first boss 13. The first collar 14 has hollow. The first collar 14 receives the first boss 13. In some embodiments, the first collar 14 may not be cylindrical. For example, the first collar 14 may be polygonal. The developer cartridge 1 may not include the first collar 14. In this case, the peripheral surface of the first boss 13 may serve as the first collar.

The first pressure receiving surface 15 has an arc-shaped surface curved along an arc about a straight line in the first direction. The first pressure receiving surface 15 is located inward from the first outer surface 111 in the first direction. In the second direction, the first pressure receiving surface 15 is located farther away from the developing roller 12 than the first boss 13.

The first boss 13 is located away from the developing roller 12 by a first distance D1 in the third direction. The first pressure receiving surface 15 is located away from the developing roller 12 by the first distance D1 or a second distance D2 smaller than the first distance D1 (D2≤D1) in the third direction. In the present embodiment, as shown in FIGS. 5 and 6, the distance between the first pressure receiving surface 15 and the developing roller 12 in the third direction is substantially equal to the first distance D1.

In the present embodiment, the first distance D1 can be defined as the distance between the outer surface of the first boss 13 and the peripheral surface of the developing roller 12, and the second distance D2 can be defined as the distance between the outer surface of the first pressure receiving surface 15 and the peripheral surface of the developing roller 12. In some embodiments, these distances may be defined differently. For example, the first distance D1 may be the distance between the center of rotation of the first boss 13 and the center of rotation of the developing roller 12, and the second distance D2 may be the distance between the center of an arc defined by the outer surface of the first pressure receiving surface 15 and the center of rotation of the developing roller 12. In other embodiments, the first distance D1 may be the distance between the peripheral surface of the first boss 13 and the peripheral surface of the developing roller shaft 12*c*, and the second distance D2 may be the distance between the outer surface of the first pressure receiving surface 15 and the peripheral surface of the developing roller shaft 12*c*.

The second boss 16 extends in the first direction. The second boss 16 in the present embodiment is a separate component from the housing 11, and is fixed to the housing 11. In some embodiments, the second boss 16 may be integral with the housing 11. The second boss 16 is movable together with the housing 11. The second boss 16 is located at the first outer surface 111. More specifically, the second boss 16 protrudes from the first outer surface 111 outward in the first direction. The second boss 16 is located farther away from the developing roller 12 in both the second and third directions than the first boss 13. In other words, the second boss 16 is opposed to the developer roller 12 toward the first boss 13 in the second direction. The second boss 16 is opposed to the developer roller 12 toward the first boss 13 in the third direction. As described in detail later, the second boss 16 receives a pressing force directed from the second end 114 toward the first end 113 in the third direction when the developer cartridge 1 is attached to the drum unit 3.

The second collar 17 is cylindrical, and is rotatable about the second boss 16. The second collar 17 has hollow. The second collar 17 receives the second boss 16. In some embodiments, the second collar 17 may not be cylindrical. For example, the second collar 17 may be polygonal. The developer cartridge 1 may not include the second collar 17. In this case, the peripheral surface of the second boss 16 may serve as the second collar.

The first protrusion 18 extends in the first direction. The first protrusion 18 is located at a first end of the developing roller 12 in the first direction. More specifically, the first protrusion 18 is located at a first end of the developing roller shaft 12*c* in the first direction. The first protrusion 18 is a separate component from the developing roller 12, and is attached to the developing roller 12. More specifically, the first protrusion 18 is a separate component from the developing roller shaft 12*c*, and is attached to the developing roller shaft 12*c*. In some embodiments, the first protrusion 18 may be integral with the developing roller 12. More specifically, the first protrusion 18 may be integral with the developing roller shaft 12*c*. As described in detail later, the first protrusion 18 contacts a guide 49 of the drum unit 3 when the developer cartridge 1 is attached to the drum unit 3. The first protrusion 18 thus positions the developer cartridge 1 relative to the drum unit 3.

The third boss 19 shown in FIGS. 4 and 6 extends in the first direction. The third boss 19 in the present embodiment is a separate component from the housing 11, and is fixed to the housing 11. In some embodiments, the third boss 19 may be integral with the housing 11. The third boss 19 is movable together with the housing 11. The third boss 19 is located at the second outer surface 112. More specifically, the third boss 19 protrudes from the second outer surface 112 outward in the first direction. The third boss 19 is located at an axis as the first boss 13 in the first direction. The developer cartridge 1 includes a third collar that is rotatable about the third boss 19. As described in detail later, the third boss 19 and the first boss 13 together bear the weight of the developer cartridge 1.

The second pressure receiving surface 21 has an arc-shaped surface curved along an arc about a straight line in the first direction. The second pressure receiving surface 21 is located away from the first pressure receiving surface 15 in the first direction. The second pressure receiving surface 21 is located inward from the second outer surface 112 in the first direction. The second pressure receiving surface 21 overlaps the first pressure receiving surface 15 when viewed in the first direction. In other words, the second pressure receiving surface 21 is located farther away from the developing roller 12 than the third boss 19 in the second direction.

The third boss 19 is located away from the developing roller 12 by a first distance D1 in the third direction. The second pressure receiving surface 21 is located away from the developing roller 12 by the first distance D1 or a second distance D2 smaller than the first distance D1 in the third direction (D2≤D1).

The fourth boss 22 extends in the first direction. The fourth boss 22 in the present embodiment is a separate component from the housing 11, and is fixed to the housing 11. In some embodiments, the fourth boss 22 may be integral with the housing 11. The fourth boss 22 is movable together with the housing 11. The fourth boss 22 is located at the second outer surface 112. More specifically, the fourth boss 22 protrudes from the second outer surface 112 outward in the first direction. The fourth boss 22 is located at the same axis as the second boss 16 extending in the first direction. The developer cartridge 1 has a collar that is rotatable about the fourth boss 22.

The second protrusion 23 extends in the first direction. The second protrusion 23 is located at a second end of the developing roller 12 in the first direction. More specifically, the second protrusion 23 is located at a second end of the developing roller shaft 12*c* in the first direction. The second protrusion 23 is a separate component from the developing roller 12, and is attached to the developing roller 12. More specifically, the second protrusion 23 is a separate component from the developing roller shaft 12*c*, and is attached to the developing roller shaft 12*c*. In some embodiments, the second protrusion 23 may be integral with the developing roller 12. More specifically, the second protrusion 23 may be integral with the developing roller shaft 12*c*. The second protrusion 23 is located at the same axis as the first protrusion 18 extending in the first direction. As described in detail later, the second protrusion 23 and the first protrusion 18 together position the developer cartridge 1 relative to the drum unit 3.

The image forming apparatus 100 according to the present embodiment includes the developer cartridge holders 30 of the first side plate 33 and the developer cartridge holders of the second side plate 34. More specifically, the developer cartridge holders 30 of the first side plate 33 and the developer cartridge holders of the second side plate 34 in the present embodiment each include a support 46, a pressing member 47, a lock lever 48, and a guide 49 as shown in FIGS. 8 and 9. The support 46, the pressing member 47, the lock lever 48, and the guide 49 in each developer cartridge holder 30 of the first side plate 33 are paired with these components in the corresponding developer cartridge holder of the second side plate 34. The developer cartridge holders 30 of the first side plate 33 will be mainly described, without repeatedly describing the developer cartridge holders of the second side plate 34.

The support 46 has a support surface 41 as shown in FIG. 10. The support 46 protrudes from the inner surface of the first side plate 33 in the first direction. The support surface 41 faces in the direction opposite the force of gravity in the present embodiment. The support surface 41 is a flat surface perpendicular to the third direction. The support surface 41 supports the first boss 13 through the first collar 14 when the developer cartridge 1 is attached to the developer cartridge holder 30.

The pressing member 47 has a first pressing surface 42. The pressing member 47 is located at the inner surface of the first side plate 33. The first pressing surface 42 is a flat surface substantially perpendicular to the second direction. The first pressing surface 42 is slidable in the second direction. The pressing member 47 includes a spring (not shown), which is an elastic member. The spring has a second length L2 when the first pressing surface 42 is free from a pressing force in the second direction. In other words, the spring has the second length L2 when the developer cartridge 1 is yet to be attached to the drum unit 3. When the developer cartridge 1 has been attached to the drum unit 3, the first pressing surface 42 is pressed against the first pressure receiving surface 15 to slide toward the second end of the drum unit in the second direction. This shortens the spring to a first length L1, which is smaller than the second length L2 (L1<L2). The spring with the first length L1 presses the first pressing surface 42 toward a first end of the drum unit 3 in the second direction. The first pressing surface 42 contacts the first pressure receiving surface 15 to apply, to the first pressure receiving surface 15, a pressing force directed from the second end toward the first end of the drum unit 3 in the second direction when the developer cartridge 1 is attached to the developer cartridge holder 30.

The lock lever 48 is movable between the lock position and the release position. In examples shown herein, the lock lever 48 is pivotable between the lock position and the release position. The lock lever 48 has a second pressing surface 43 and a guide surface 51. The guide surface 51 is arc-shaped. The second pressing surface 43 is a flat surface continuous with the guide surface 51. When the lock lever 48 is at the lock position, the guide surface 51 is at least partially located between the first side plate 33 and the second side plate 34, and the second pressing surface 43 is substantially perpendicular to the third direction and faces toward a second end of the drum unit 3 in the third direction. When the lock lever 48 is at the release position, the guide surface 51 is located farther away from the second side plate 34 than when the lock lever 48 is at the lock position. The second pressing surface 43 contacts the second boss 16 through the second collar 17 when the developer cartridge 1 is inserted in the developer cartridge holder 30 of the drum unit 3. This applies, to the second boss 16, a pressing force directed from a first end of the drum unit 3 in the third direction toward the second end of the drum unit 3 in the third direction. The lock lever 48 prevents the developer cartridge 1 from easily separating under impact or vibrations.

The guide 49 has a first guide surface 44 and a second guide surface 45. The guide 49 is located at the inner surface of the first side plate 33. The guide 49 protrudes from the inner side surface of the first side plate 33 in the first direction. The first guide surface 44 is a flat surface substantially perpendicular to the third direction. The guide 49 contacts the first protrusion 18 when the developer cartridge 1 rotates about the first boss 13. The guide 49 thus positions the developer cartridge 1 relative to the drum unit 3.

The second guide surface 45 has a flat surface and a slope surface continuous with the flat surface. The flat surface is substantially perpendicular to the third direction. One end of the slope surface in the second direction connects to the flat surface. The slope surface slopes from one end of the slope surface in the second direction to the other end in the third direction toward the other end of the slope in the second direction. The second guide surface 45 is spaced from the first protrusion 18 in the third direction when the developer cartridge 1 rotates about the first boss 13. This prevents the developer cartridge 1 from being greatly misaligned relative to the drum unit 3.

5. Detailed Structure of Lock Mechanism

The structure of the lock lever 48 according to the present embodiment will now be described in detail. A lock mechanism according to the present embodiment includes the lock lever 48.

As shown in FIGS. 8 to 10, the lock levers 48 are arranged at positions corresponding to the developer cartridges 1 to be attached to the drum unit 3. The lock levers 48 located at the first side plate 33 are paired with the corresponding lock levers 48 located at the second side plate 34. The lock levers 48 located at the first side plate 33 will be mainly described without repeatedly describing the lock levers 48 located at the second side plate 34.

The first side plate 33 has a plurality of openings 33*a* located at a first end of the first side plate 33 in the third direction (end in the direction opposite the force of gravity). The plurality of openings 33*a* are spaced from one another in the second direction. Each opening 33*a* is rectangular, and extends through the first side plate 33 in the first direction. In the present embodiment, the first side plate 33 has four openings 33*a* to receive four developer cartridges 1 to be attached to the drum unit 3. The lock lever 48 is exposed through each opening 33*a*.

In detail, each opening 33*a* is defined by a first inner wall of the first side plate 33 located at a first end of the first side plate 33 in the second direction and a second inner wall of the first side plate 33 located at a second end of the first side plate 33 in the second direction. The lock lever 48 includes a pivot shaft (not shown) between the first inner wall and the second inner wall in the second direction. The lock lever 48 is pivotable about the pivot shaft.

The lock lever 48 includes an arc-shaped guide surface 51. The lock lever 48 is pivotable about a pivot axis between the lock position and the release position. When the lock lever 48 is at the lock position, the guide surface 51 is at least partially located between the first side plate 33 and the second side plate 34 in the first direction. When the lock lever 48 is at the release position, the guide surface 51 is located farther away from the first side plate 33 in the first direction than when the lock lever 48 is at the lock position.

The lock lever 48 at the lock position applies, to the developer cartridge 1 attached to the drum unit 3, a pressing force directed from the first end of the drum unit 3 in the third direction toward the second end of the drum unit 3 in the third direction. This prevents the developer cartridge 1 from easily separating from the drum unit 3 under impact or vibrations.

The lock lever 48 at the release position allows the developer cartridge 1 to be inserted into the developer cartridge holder 30 of the drum unit 3 or to be removed from the developer cartridge holder 30 of the drum unit 3.

The guide surface 51 of the lock lever 48 guides the developer cartridge 1 (a first outer surface 111 and a second outer surface 112) during attachment of the developer cartridge 1 to the developer cartridge holder 30 of the drum unit 3.

The lock lever 48 includes an elastic spring (not shown) that applies a pressing force directed from the first end of the drum unit 3 in the third direction to the second end of the drum unit 3 in the third direction when the developer cartridge 1 is attached to the developer cartridge holder 30 of the drum unit 3. In other words, the lock lever 48 is constantly pressed toward the lock position by the spring force.

6. Forces Acting Relative to One Another in Attaching Developer Cartridge

The forces acting relative to one another during attachment of the developer cartridge 1 to the developer cartridge holder 30 of the drum unit 3 will now be described with reference mainly to FIGS. 8 to 15.

To attach the developer cartridge 1 to the drum unit 3, the user first holds the developer cartridge 1 to have the first end 113 of the housing 11 facing the second end of the drum unit 3 in the third direction and the second end 114 of the housing 11 facing the first end of the drum unit 3 in the third direction. The user then inserts the developer cartridge 1 into the developer cartridge holders (the developer cartridge holder 30 of the first side plate 33 and the developer cartridge holder of the second side plate 34) from the first end of the drum unit 3 in the third direction toward the second end of the drum unit 3 in the third direction (refer to FIG. 8). As a result, the guide surface 51 of the lock lever 48 contact with the second boss 16 (second collar 17), causing the guide surface 51 of the lock lever 48 pivots outward in the drum unit 3. In this manner, the lock lever 48 pivots toward the release position and the end faces (the first outer surface 111 and the second outer surface 112) of the developer cartridge 1 is guided along the arc-shaped guide surface 51. As a result, the user smoothly pushes the developer cartridge 1 toward the second end of the drum unit 3 in the third direction.

Then, the first boss 13 is supported by the support surface 41 through the first collar 14. The support surface 41 bears the weight of the developer cartridge 1.

As the user pushes the developer cartridge 1 toward the second end of the drum unit 3 in the third direction during movement of the lock lever 48 from the lock position to the release position against the pressing force applied from the spring of the lock lever 48, the second boss 16 moves toward the second end of the drum unit 3 in the third direction farther than the lock lever 48. The lock lever 48 then pivots to the lock position under the pressing force applied from the spring of the lock lever 48. The lock lever 48 then moves to the lock position under the pressing force applied from the spring of the lock lever 48, thus causing the second pressing surface 43 to apply, to the second boss 16 (second collar 17), a pressing force directed from the first end of the drum unit 3 in the third direction toward the second end of the drum unit 3 in the third direction.

More specifically, the second boss 16 (second collar 17) contacts the second pressing surface 43 of the lock lever 48 at the lock position to receive, from the second pressing surface 43, a pressing force directed from the second end 114 of the housing 11 toward the first end 113 of the housing 11 in the third direction. At this position, the first boss 13 is supported by the support surface 41 located at a second end of the drum unit 3 in the third direction. These opposite forces cause a rotation moment in the developer cartridge 1 about the first boss 13. This slightly rotates the developer cartridge 1 about the first boss 13 in the drum unit 3, and moves the developing roller 12 toward the photosensitive drum 31. As the developing roller 12 moves toward the photosensitive drum 31, the first protrusion 18 contacts the first guide surface 44 to stop the rotation of the developer cartridge 1 about the first boss 13. This determines the angle of contact between the developing roller 12 and the photosensitive drum 31, and appropriately positions the developing roller 12 relative to the photosensitive drum 31. In other words, the developer cartridge 1 is positioned in the drum unit 3.

As the user inserts the developer cartridge 1 into the drum unit 3 from the first end of the drum unit 3 in the third direction toward the second end of the drum unit 3 in the third direction, the first pressing surface 42 is pushed by the first pressure receiving surface 15 to move toward the second end of the drum unit 3 in the second direction against the pressing force of the spring of the pressing member 47. The first pressure receiving surface 15 thus receives, from the first pressing surface 42, a pressing force directed from the covered surface **12*b* toward the uncovered surface 12*a* in the second direction at the same time as or subsequently to slight rotation of the developer cartridge 1 about the first boss 13. At this position, the support surface 41 receives the weight of the developer cartridge 1 applied through the first boss 13. The first boss 13 (first collar 14) thus slides toward the first end of the drum unit 3 in the second direction when the first boss 13 is supported by the support surface 41. This moves the developing roller 12 further toward the photosensitive drum 31, and allows the peripheral surface of the developing roller 12 (developing roller body) to contact the peripheral surface of the photosensitive drum 31 under an appropriate contact pressure. At this position, the support surface 41 bears the weight of the developer cartridge 1. The weight of the developer cartridge 1 is less likely to affect the contact pressure between the developing roller 12 and the photosensitive drum 31. In other words, the contact pressure between the developing roller 12 and the photosensitive drum 31 is determined solely by the pressing force applied from the spring of the pressing member 47 and the pressing force applied from the spring of the lock lever 48. This prevents the contact pressure between the developing roller 12 and the photosensitive drum 31 from varying greatly depending on the amount of toner remaining in the developer cartridge 1**.

Immediately before the peripheral surface of the developing roller 12 (developing roller body) contacts the peripheral surface of the photosensitive drum 31, the first protrusion 18 is held between the first guide surface 44 and the second guide surface 45 in the third direction (refer to FIG. 10). This structure appropriately positions the developing roller 12 relative to the photosensitive drum 31. The slope surface included in the second guide surface 45 smoothly guides the developing roller 12 between the first guide surface 44 and the second guide surface 45.

In the manner described above, the developer cartridge 1 is appropriately positioned relative to the drum unit 3 when the developer cartridge 1 is attached to the drum unit 3. When the developer cartridge 1 is attached to the drum unit 3, the lock lever 48 is at the lock position, restricting the movement of the developer cartridge 1 toward the first end of the drum unit 3 in the third direction (in the direction opposite the force of gravity). The second pressing surface 43 thus locks the developer cartridge 1. The developer cartridge 1 thus does not easily separate from the drum unit 3 under vibrations or impact applied to the image forming apparatus 100. The structure according to the present embodiment enables reliable attachment and removal of the developer cartridge 1 to and from the drum unit 3 as well as reliable locking.

To remove the developer cartridge 1 from the drum unit 3, the lock lever 48 is temporarily pivoted toward the release position to move the developer cartridge 1 toward the first end of the drum unit 3 in the third direction during movement of the first outer surface 111 and the second outer surface 112 along the curve of the arc-shaped guide surface 51.

In the present embodiment, the lock lever 48 is pivotable about the pivot axis extending in the second direction. The lock lever 48 is switched between the lock position and the release position for attaching or removing the developer cartridge 1 to and from the drum unit 3. This structure allows each of the lock levers 48 to be positioned so that the first surface 111 or the second outer surface 112 of a corresponding developer cartridge 1 held by the frame 38 completely overlaps the lock lever 48 as viewed in the first direction. In other words, each of the lock levers 48 is positioned entirely between a third outer surface and a fourth outer surface of the corresponding developer cartridge 1. The third outer surface extends between the first outer surface and the second outer surface in the first direction. The fourth outer surface extends between the first outer surface and the second outer surface in the first direction. The fourth outer surface is spaced from the third outer surface in the second direction. This eliminates the clearance required for the lock lever 48 to pivot between the developer cartridges 1 adjacent in the second direction, and thus allows the adjacent developer cartridges 1 to be closer to one another. The drum unit 3 is downsized in the direction in which the photosensitive drums 31 are arranged.

What is claimed is:

1. A device for use with an image forming apparatus, comprising:
- a frame including:
- a roller rotatable about a first axis extending in a first direction, and
- a lock lever pivotable about a first pivot axis extending in a second direction intersecting with the first direction, the lock lever being pivotable between a first lock position at which a cartridge is locked relative to the frame and a first unlock position at which the cartridge is unlocked relative to the frame.

2. The device for use with an image forming apparatus according to claim 1,
- wherein the roller is a photosensitive drum.

3. The device for use with an image forming apparatus according to claim 1,
- wherein the cartridge is a developer cartridge including a developing roller.

4. The device for use with an image forming apparatus according to claim 1,
- wherein the frame is configured to rotatably support the roller.

5. The device for use with an image forming apparatus according to claim 1,
- wherein the cartridge is detachably attachable to the frame.

6. The device for use with an image forming apparatus according to claim 1,
- wherein the second direction is perpendicular to the first direction.

7. The device for use with an image forming apparatus according to claim 1,
- wherein the lock lever includes a first surface configured to contact a part of the cartridge in a state where the lock lever is at the first lock position, and
- wherein the first surface is separate from the part of the cartridge in a state where the lock lever is at the first unlock position.

8. The device for use with an image forming apparatus according to claim 7,
- wherein the frame includes a first side plate and a second side plate spaced apart from the first side plate in the first direction, and
- wherein the first surface is positioned farther away from an area between the first side plate and the second side plate in the first direction in the state where the lock lever is at the first unlock position than in the state where the lock lever is at the first lock position.

* * * * *